Nov. 29, 1949     O. ZANCAN     2,489,735
TRANSMISSION CONTROL ONE WAY SHIFT LEVER
Filed Nov. 15, 1948     2 Sheets-Sheet 1
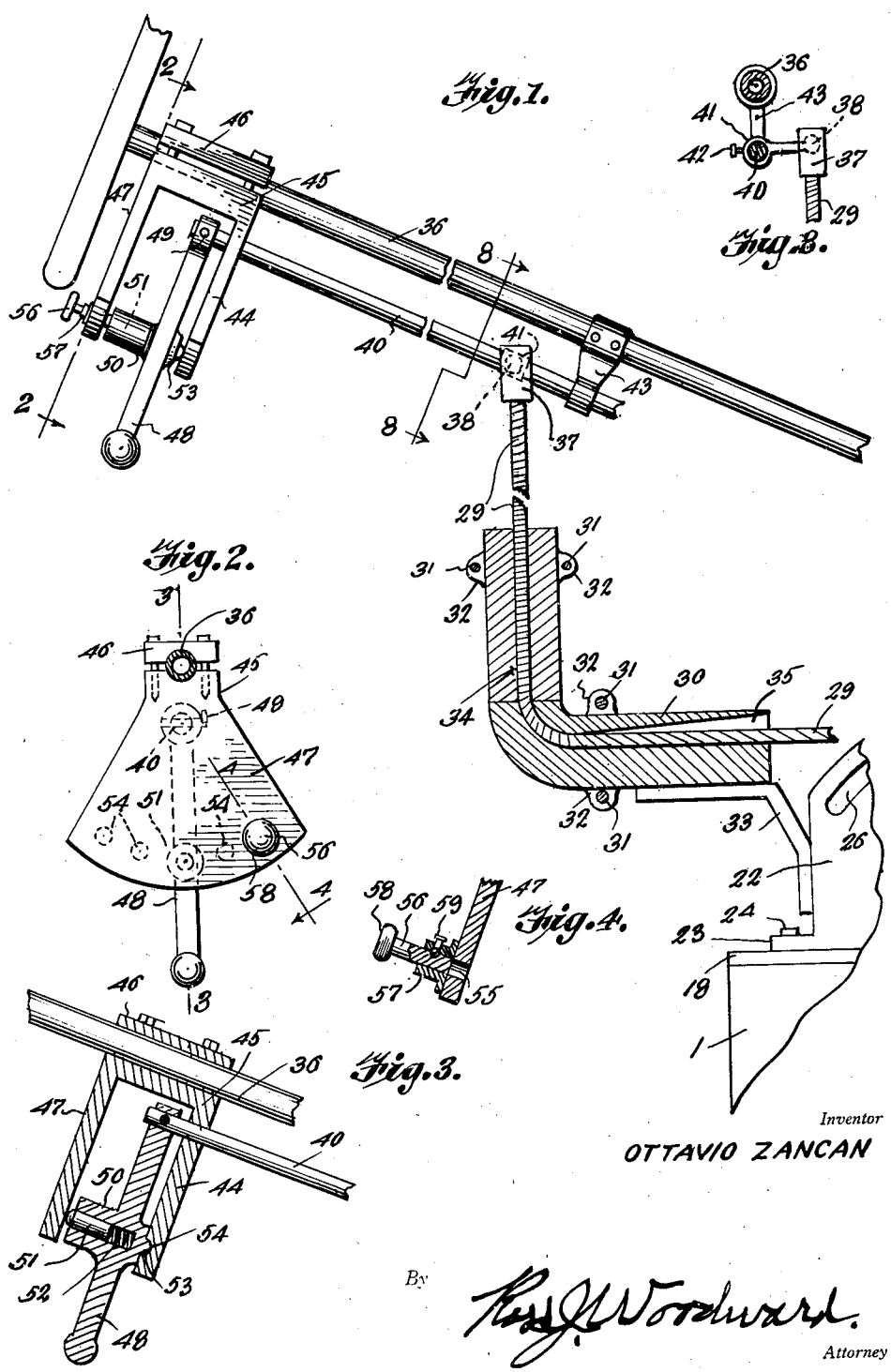
Inventor
OTTAVIO ZANCAN

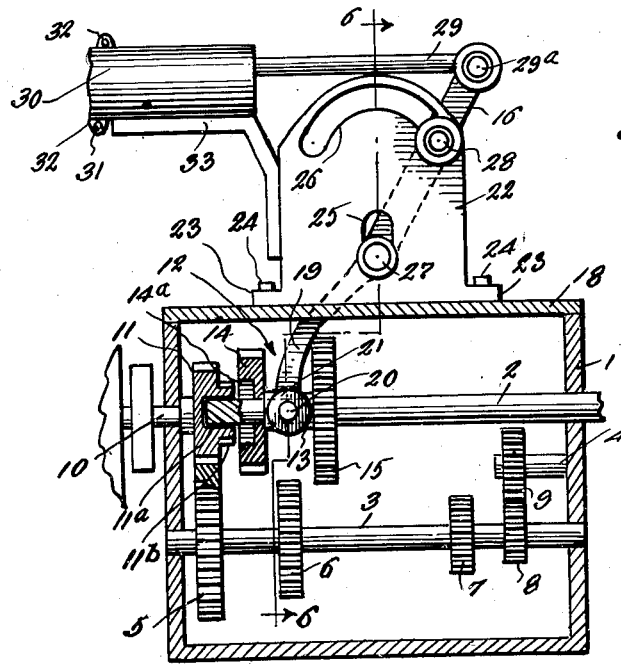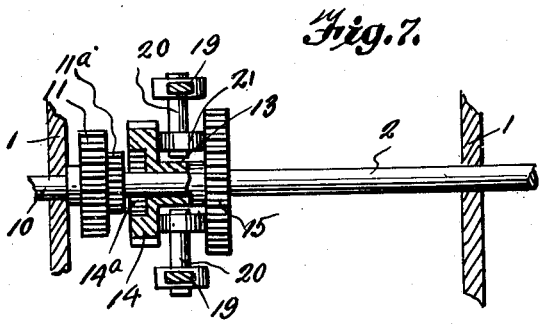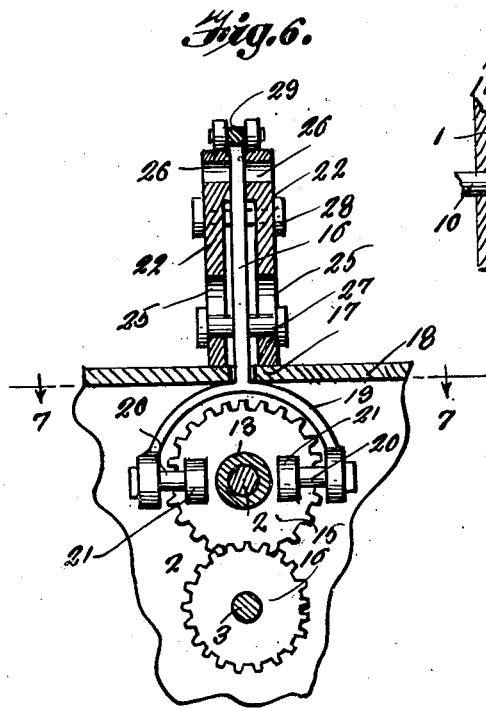

Patented Nov. 29, 1949

2,489,735

UNITED STATES PATENT OFFICE 2,489,735

TRANSMISSION CONTROL ONE-WAY SHIFT LEVER

Ottavio Zancan, New York, N. Y.

Application November 15, 1948, Serial No. 60,130

3 Claims. (Cl. 74—476)

1

This invention relates to a transmission of the type covered by my prior Patent 2,403,166 issued July 2, 1946, and it is one object of the invention to provide a transmission control linkage which is particularly adapted for use upon automobiles and other motor vehicles and includes in its construction a box of gears and a lever for shifting gears to positions for obtaining predetermined speeds and operating means for the said lever of such construction and so associated with the steering post of a motor vehicle that a handle or lever for the operating mechanism will be in position where it may be readily grasped by a person holding the steering wheel of the car.

Another object of the invention is to provide an operating mechanism wherein a flexible shaft has one end connected with the gear lever and its other end connected with an arm extending radially from a rotatably mounted actuating shaft mounted longitudinally of the steering shaft and carrying at its upper end a handle by means of which the actuating shaft is turned in order to swing its arm and thus impart longitudinal movement to the flexible shaft and effect shifting of gears in the gear box.

Another object of the invention is to provide an operating mechanism wherein the handle or lever for the actuating shaft thereof extends through a frame clamped to the steering post and special latch means is provided for holding the handle in an adjusted position.

Another object of the invention is to provide a transmission and operating mechanism therefor of such construction that the gears may be very easily and smoothly shifted into position for various speeds and without it being necessary to shift the handle or lever first in one direction and then in an opposite direction in order to progressively increase or decrease the speed of the vehicle.

Another object of the invention is to provide the operating mechanism with a handle and a rack structure of such construction that the handle will be prevented from moving to a reversing position accidently and thereby prevent gears from being stripped or otherwise damaged, the gears being shifted into reverse while the vehicle is moving forwardly.

The invention is illustrated in the accompanying drawings wherein:

Fig. 1 is a view showing the operating mechanism of the transmission partially in side elevation and partially in section.

Fig. 2 is a view taken along the line 2—2 of Figure 1.

2

Fig. 3 is a sectional view taken along the line 3—3 of Figure 2.

Fig. 4 is a fragmentary sectional view taken along the line 4—4 of Figure 2.

Fig. 5 is a view showing the gear box in section and the gearing therein in side elevation.

Fig. 6 is a transverse sectional view taken along the line 6—6 of Figure 5.

Fig. 7 is a fragmentary sectional view taken along the line 7—7 of Figure 6.

Fig. 8 is a sectional view taken transversely through the steering post and the actuating shaft supported in spaced relation thereof.

This improved transmission is particularly adapted for use in connection with an automobile, or other motor vehicle, but it will be understood that it may be installed in any other power driven device for which it is found suitable.

The gear box 1 may be of any dimensions desired and within this box are mounted a main shaft 2, which may be connected with or form a portion of the transmission shaft of a vehicle, a counter shaft 3, and a stub shaft 4. Gears 5, 6, and 7 of progressively decreasing diameters are keyed upon the counter shaft so that they turn with shaft and a small gear 8 keyed to shaft 3 meshes with a gear 9 rotatably carried by shaft 4. A shaft 10 with which the clutch is connected is journaled through an end wall of the box and carries a gear 11 meshing with gear 5 and formed at its center with a socket 11a surrounded by a clutch number 11b having teeth about its periphery. The shaft 2 has its inner end rotating mounted in the socket 11a. The shaft 2 carries a compound gear 12 which is keyed thereto and is slidable along the shaft, and referring to Figure 7 it will be seen that the compound gear consists of a sleeve 13 carrying gears or pinions 14 and 15 of such diameter that they may be intermeshed respectively with the gears or pinions 6 and 7. When the compound gear 12 is moved along shaft 2 to a position where the clutch member 11b enters the socket 14a, the gear 15 is out of mesh with the gear 6 and the automobile will be driven forwardly at high speed as shaft 2 will be turned at the same speed as shaft 10. When the gears or pinions 14 and 6 are in mesh with each other the automobile will move at second speed, and when the large pinion 15 is in mesh with the small pinion 8 low speed will be obtained. When gear 15 is disposed in the space between the gears 7 and 8 the transmission will be at neutral as no motion is transmitted to shaft 2 from shaft 3, and when the gear 15 is in mesh with gear 9 directional rotation of the shaft 4 will be reversed and the automobile will travel rearwardly. When the gear 15 is in the neutral position and the automobile is to be driven forwardly first at low speed, then at second speed, and finally at high speed, it is merely necessary to slide the compound gear 12 along the shaft 2 towards the left on Figure 5 and slow speed will first be obtained as gear 15 meshed with gear 7 second speed obtained when gear 14 meshed with gear 6, and high speed obtained when the clutch number 11b engages in the socket 14a of gear 14. The fact that the compound gear moves in the same direction from low speed to high speed and is moved in an opposite direction towards the right from the neutral position to a reversing position in which gear 15 meshes with gear 9 eliminates any danger of the transmission being damaged by accidental movement of gear 15 into mesh with the reversing gear as the compound gear is moved towards the high speed position.

In order to shift the compound gear 12 along the shaft 2 there has been provided a lever 16 which extends vertically through an opening or slot 17 formed in the top or cover 18 of the gear box and has a fork 19 at its lower end. This fork extends transversely of the main shaft in straddling relation thereto and at lower ends of its arms carries short shafts or trunnions 20 upon which are mounted rollers 21. The shift lever extends upwardly from the gear box between plates 22 and since each of these plates has feet 23 at its lower end through which bolts 24 are passed the plates will be firmly mounted upon the cover of the gear box and maintained in spaced parallel relation to each other. Aligned openings 25 are formed vertically through the lower portions of these plates and on the upper portions are formed transversely extending slots 26 which are substantially arcuate but have their end portions extending downwardly in a diagonal directional towards side edges of the said plates. A pivot pin 27 for the shift lever passes through the vertical openings 24 and the upper portion of the lever carries a cross pin 28 which is slidably engaged through the slots 26. The slots 26 serve as tracks for the pin 28 and when the lever is swung about the pivot pin 27 movement of the guide pin 28 through the arcuate slots causes the lever to be shifted vertically as it moves pivotally. Therefore rollers 21 will be held in a horizontal plane in which they will engage the gear 14 or the gear 15 at points in diametrically opposed relation to each other and the compound gear will be shifted along the main shaft and cause the counter shaft 3 and the transmission shaft 4 to be rotated at a desired speed.

Tilting or swinging movement is imparted to the lever 16 by means of a rod 29 which may be flexible throughout its length or consist of front and rear sections connected by a flexible intermediate section. This rod has its front end pivoted to the upper end of the shift lever 16 by a pin 29a and passes through an elongated bearing 30 which is formed of companion sections secured together by screws 31 passing through ears 32. The forward portion of the bearing extends horizontally and is mounted upon a bracket 33 carried by the plates 22 and its rear portion extends vertically, as shown in Figure 1. It should also be noted that the forward portion of the bore 34 of this sleeve or bearing is gradually enlarged to form a flaring mouth 35 and thus allow the forward portion of the rod 29 to be flexed vertically during longitudinal movement of the rod and swinging movement of the shift lever. The rod 29 may be of any length necessary for its rear portion to terminate adjacent the steering column or post 36 and its rear end carries a socket 37 in which engages a ball 38 at the outer end of an arm 39, which extends radially from a shaft 40, and at its inner end is formed with a sleeve 41 which fits snugly about the shaft and is prevented from turning about the shaft by a set screw 42. The shaft 40 is rotatably mounted through a suitable number of bearing brackets 43 carried by the steering post and its upper or rear portion passes through the lower plate 44 of a frame 45. This frame is secured to the steering post by a clamp 46 and has an upper plate 47 disposed in spaced relation to the lower plate 44 to permit swinging movement of a handle 48 by means of which the shaft 40 is turned. The handle or lever fits about the upper or rear end of the shaft 40 and is secured thereto by a pin 49. Intermediate its length the handle is formed with a socket 50 which projects from the handle towards the upper or rear plate 47 of the frame 45 and slidably screws a plunger 51 which is urged outwardly by a spring 52. Under the socket the handle is formed with a lug or tooth 53 for engaging in recesses or seats 54 formed in an arcuate path in the upper or inner face of plate 44. The spring holds the plunger against the upper plate and urges the lever downwardly toward the lower plate of the frame and this causes the tooth 53 to engage in the recesses or seats 54 and rebearably hold the lever or handle in adjusted positions. Since the lever is lifted to shift the tooth 58 out of position to engage in the recesses or plates the lever may be swung transversely without noises being made by the tooth moving outward out of the seats. Turning movement of the shaft imparts swinging movement to the arm 39 and as this arm swings the rod 29 is shifted longitudinally through the bearing sleeve 30 and the shift lever is tilted about its pivot 24 and its pin 28 moved through the slots 26. During this movement of the shift lever the compound gear 12 will be shifted along the main shaft 2 and the gears or pinions 14 and 15 of the compound gear successively moved into position for meshing with the companion gears 6 and 7 on the counter shaft 3 and the gear 11 to progressively increase the speed at which the vehicle is moved forwardly. An opening 55 is formed through the upper plate 47 so that as the handle is moved from the neutral position towards the reversing position the plunger 51 will be forced upwardly into the opening by the spring 52 and prevent the handle from reaching the reversing position. Therefore the gear 15 cannot be accidentally moved into position to mesh with the reversing gear 9 while the vehicle is moving forwardly and strip the gears. A plunger 56 is slidably mounted through a sleeve 57 projecting from the upper plate about the opening 55 and this plunger is formed at its upper end with a knob 58 so that it may be easily moved to a lower position or to a raised position where it is held by a latch 59. When it is desired to move the handle to the reversing position it is merely necessary to press the plunger 56 downwardly so that its lower portion enters and fills the opening 55 and prevents the plunger 51 from engaging in the opening. Therefore the plunger 51 may pass across the opening 55 and the handle may be moved to the reversing position and thus dispose the gear 15 in mesh with gear 9 and cause the vehicle to move rearwardly. Danger of accidently reversing the gears is therefore eliminated but reversing can be easily accomplished when so desired.

The drawings illustrate a practical embodiment of the invention but since modification may be developed in commercial exploitation of the invention it is to be understood that I reserve the right to make changes in construction and arrangement of parts which come within the scope of the appended claims.

Having this described the invention, what is claimed is:

1. In a transmission including a casing and gearing in the casing including a gear shiftable along a shaft to adjusted positions; a lever for moving the gear along the shaft to adjusted positions extending into the casing and having its inner end in operative relation to the shiftable gear, a flexible rod slidable longitudinally and having its front end connected with said lever for tilting the lever and thereby adjusting the position of the gear upon said shaft when the rod is slid longitudinally, an actuating shaft, bearing brackets adapted to be secured to a steering post of a vehicle and rotatably mount the actuating shaft in spaced and substantially parallel relation to the said steering post, a frame adapted to be mounted upon said steering post with the rear end portion of the actuating shaft extending into the frame, an arm extending laterally from said actuating shaft and connected with said flexible rod and serving to shift the rod longitudinally and move the lever when the actuating shaft is rotated, said frame having upper and lower plates, said actuating shaft passing through the lower plate and into space between the plates, a handle carried by the actuating shaft and extending between the said upper and lower plates and extending laterally from the actuating shaft with its free end portion projecting from the frame, the lower plate being formed with a series of seats arranged in an arcuate path and the handle being provided with a lug for engaging in the seats and temporarily halting movement of the handle as the handle is moved to turn the shaft and shift the gear to adjusted positions, the upper plate being formed with an opening, a plunger carried by the handle for engaging in the opening in the upper plate and normally preventing movement of the handle to a position for shifting the gear to a reversing position, and a member movable into position to block the opening and permit the plunger to cross the opening and the handle to move to the reversing position.

2. In a transmission including a casing and gearing in the casing including a gear shiftable along a shaft to adjusted positions; a lever for moving the gear along the shaft to adjusted positions extending into the casing and having its inner end in operative relation to the shiftable gear, a rod slidable longitudinally and having its front end connected with said lever for tilting the lever and thereby adjusting the position of the gear when the rod is slid longitudinally, an actuating shaft, a bearing bracket adapted to be connected with a steering post of a vehicle and rotatably support the actuating shaft in spaced and substantially parallel relation to the steering post, a frame adapted to be mounted upon the steering post with the rear end portion of the actuating shaft extending into the frame, an arm extending laterally from said actuating shaft and connected with said rod by a coupling and serving to shift the rod longitudinally and thereby actuating the lever when the actuating shaft is rotated, said frame having upper and lower plates and through the lower one of which the actuating shaft passes, a handle carried by the actuating shaft and extending through the space between the said upper and lower plates with its free end portion projecting from the frame, the lower plate being formed with a series of seats arranged in an arcuate path and the handle being provided with a lug at its lower end for engaging in the seats and temporarily halting movement of the handle as the handle is moved to turn the actuating shaft and shift the gear to adjusted positions, a socket being formed in the handle over the lug, a plunger slidable vertically in the socket, a spring in the socket holding the plunger in engagement with the under face of the upper plate and urging the handle downwardly in position for its lug to enter the seats and hold the handle in adjusted positions, the upper plate being formed with an opening into which the plunger is engageable to normally prevent movement of the handle to a position for disposing the gearing in reverse, and means movable into and out of position for blocking the opening and allowing the plunger to pass across the said opening and thereby permit movement of the handle to a position for effecting reversing of the gearing.

3. In a transmission including a casing and gearing in the casing including a gear shiftable along a shaft to adjusted positions; a lever for moving the gear along the shaft to adjusted positions extending into the casing and having its inner end in operative relation to the shiftable gear, a rod slidably mounted for longitudinal movement and having its front end connected with said lever for tilting the lever and adjusting the position of the shiftable gear when the rod is slid longitudinally, an actuating shaft, bearing brackets for rotatably mounting the actuating shaft adapted to be secured to a steering post of a vehicle and support the actuating shaft in substantially parallel relation to the steering post, a frame adapted to be mounted upon the steering post, the rear end portion of said actuating shaft extending into the frame, an arm extending laterally from said actuating shaft and pivotally connected with said rod and serving to shift the rod longitudinally and thereby tilt the lever when the actuating shaft is rotated, said frame having upper and lower plates and through the lower one of which the actuating shaft passes, a handle carried by the portion of the actuating shaft between the said upper and lower plates and having its free end portion projecting from the frame, the lower plate being formed with a series of seats arranged in an arcuate path and the handle being provided with a lug at its lower end for engaging in the seats and temporarily halting movement of the handle as the handle is swung to turn the actuating shaft and move said rod longitudinally to shift the gear to adjusted positions, a socket being formed in the handle over the lug, a plunger slidable vertically in the socket, a spring in the socket urging said plunger upwardly and yieldably holding the plunger in engagement with the upper plate and also urging the handle downwardly into position for engagement of its lug in the seats, the upper plate being formed with an opening into which the plunger is engageable to normally prevent movement of the handle to a position for disposing the gearing in reverse, a sleeve rising from the upper plate about the opening therein, a plunger slidable vertically through the sleeve into and out of positions to fill the opening in the upper plate and thereby allow movement of the plunger of the handle across the opening during movement of the handle towards a position for effecting reversal of gearing, and a latch carried by said sleeve and engageable with the plunger for releasably holding the plunger in a raised position out of filling relation to the opening.

OTTAVIO ZANCAN.

REFERENCES CITED

The following references are of record in the file of this patent:

UNITED STATES PATENTS

| Number | Name | Date |
|---|---|---|
| 624,739 | Beall | May 9, 1899 |
| 902,558 | Coldwell | Nov. 3, 1908 |
| 1,645,464 | Tredway | Oct. 11, 1927 |
| 1,885,413 | Cappa | Nov. 1, 1932 |
| 1,889,909 | Upton | Dec. 6, 1932 |
| 2,031,807 | Werner | Feb. 25, 1936 |
| 2,303,787 | Burd | Dec. 1, 1942 |
| 2,319,716 | Bixby | May 18, 1943 |
| 2,398,243 | Morse | Apr. 9, 1946 |
| 2,403,162 | Zancan | July 2, 1946 |